United States Patent
Mandel et al.

(10) Patent No.: US 6,941,320 B2
(45) Date of Patent: Sep. 6, 2005

(54) CONTACT CENTER DYNAMIC RECORD DELIVERY

(76) Inventors: Edward Mandel, 14881 Quorum Dr., Suite 440, Dallas, TX (US) 75240; Donald Hudecek, 14881 Quorum Dr., Suite 440, Dallas, TX (US) 75240

(*) Notice: Subject to any disclaimer, the term of this patent is extended or adjusted under 35 U.S.C. 154(b) by 356 days.

(21) Appl. No.: 10/151,489

(22) Filed: May 18, 2002

(65) Prior Publication Data

US 2003/0145019 A1 Jul. 31, 2003

Related U.S. Application Data

(60) Provisional application No. 60/351,761, filed on Jan. 25, 2002.

(51) Int. Cl.[7] .............................................. G06F 17/30
(52) U.S. Cl. .............................................. 707/102; 7/6
(58) Field of Search ...................... 707/102, 7; 370/229

(56) References Cited

U.S. PATENT DOCUMENTS

| | | | | | |
|---|---|---|---|---|---|
| 4,881,261 | A | * | 11/1989 | Oliphant et al. | 379/266.08 |
| 5,828,747 | A | * | 10/1998 | Fisher et al. | 379/265.12 |
| 6,002,760 | A | * | 12/1999 | Gisby | 379/266.01 |
| 6,014,647 | A | * | 1/2000 | Nizzari et al. | 705/39 |
| 6,157,655 | A | * | 12/2000 | Shtivelman | 370/412 |
| 6,198,814 | B1 | * | 3/2001 | Gill | 379/266.01 |
| 6,363,411 | B1 | * | 3/2002 | Dugan et al. | 709/202 |
| 6,449,358 | B1 | * | 9/2002 | Anisimov et al. | 379/266.07 |
| 6,452,915 | B1 | * | 9/2002 | Jorgensen | 370/338 |
| 6,563,788 | B1 | * | 5/2003 | Torba et al. | 370/229 |
| 6,804,345 | B1 | * | 10/2004 | Bala et al. | 379/265.04 |
| 2001/0000458 | A1 | * | 4/2001 | Shtivelman et al. | 370/412 |
| 2001/0040887 | A1 | * | 11/2001 | Shtivelman et al. | 370/352 |
| 2002/0072951 | A1 | * | 6/2002 | Lee et al. | 705/10 |
| 2002/0120462 | A1 | * | 8/2002 | Good | 705/1 |
| 2003/0018762 | A1 | * | 1/2003 | Mullen | 709/223 |

* cited by examiner

*Primary Examiner*—Wayne Amsbury
(74) *Attorney, Agent, or Firm*—Thrasher Associates, LLC

(57) ABSTRACT

The invention, in one embodiment, generally establishes a master queue with a priority order based on predefined criteria, and then distributes information about a first prospect to one agent, and information about a second prospect to a second agent and so on, in the priority order. The prospect information is distributed without duplication, and can be updated dynamically, including when a prospect's information is not in the master queue.

20 Claims, 6 Drawing Sheets

CONTACT CENTER DYNAMIC RECORD DELIVERY

This application claims the benefit of 60/351,761 filed on Jan. 25, 2002

TECHNICAL FIELD

Generally, the invention relates to call centers, and, more particularly, the invention relates to software used to manage call center prospect information.

STATEMENT OF A PROBLEM ADDRESSED BY THIS INVENTION

Interpretation Considerations

This section describes the technical field in more detail, and discusses problems encountered in the technical field. This section does not describe prior art as defined for purposes of anticipation or obviousness under 35 U.S.C. section 102 or 35 U.S.C. section 103. Thus, nothing stated in the Statement of a Problem Addressed by This Invention is to be construed as prior art.

Discussion

In a call center, which may include any localized or distributed client-contact environment, an agent receives prospect profiles and contact information, and then calls or otherwise contacts prospects in the hope of making a sale, getting a commitment, or distributing information to a prospect. For example, an agent may receive information regarding the prospect's name, number of family members, ages, and/or other relevant information that can be used by the salesperson to close a sale.

The agent may use the information to convince a prospect to make a desired decision, such as to make a purchase (such as convincing the prospect to switch to a new long distance provider). The agent may also use the information to inform the prospect about the features and benefits of a particular product in the hopes that the prospect will buy the product locally. Information may also be used to inform and persuade a prospect. For example, a prospect may be encouraged to participate a particular way in a particular event, such as using push-polling to get prospects to vote a certain way in an election. Additionally, contacts may be made with persons who owe money as part of a collections effort. In this situation, information is used to get a commitment, such as a payment by a date certain, from a prospect/contact. Of course, an agent may also enter information in response to a call placed to the prospect.

However, call center software has several problems. For example, call center software may actually pass off the same prospect to several different agents, resulting in (at the least) wasted effort, and may produce a disgruntled prospect who will no longer consider taking the position of the agent. In addition, each of a number of agents may be distributed a list of clients to contact at the beginning of a shift, but inevitably, some agents will complete their list of contacts before other agents, resulting in idle time.

Furthermore, systems that do allow an agent to contact a prospect typically allow agents to see prospect information, which results in "cherry-picking" of the best prospects by the more aggressive agents. Of course, there are many other drawbacks to the present state-of-the-art, which will become more apparent as the invention is discussed. Accordingly, to overcome these and other disadvantages associated with existing methods of managing call center contacts, it would be advantageous to provide call center prospect management software that increases the efficiency and effectiveness of prospect databases.

SELECTED OVERVIEW OF SELECTED EMBODIMENTS

The present invention achieves technical advantages as devices, software, and methods for managing call center software. The preferred device is a computer system in a call center that dynamically manages prospect information. The method generally establishes a master queue with an optional priority order based on criteria that may either be predefined or dynamically defined, and then distributes information about a first prospect to one agent, and information about a second prospect to a second agent and so on. The prospect information is distributed without unintentional duplication, and can be updated dynamically, even when a prospect's information is not in the master queue. To practice the method, software may be loaded onto a computing platform and then executed according to the method. Furthermore, the invention may be embodied on a software medium, such as a CD ROM, or transmitted over the internet as a data signal.

Of course, other features and embodiments of the invention will be apparent to those of ordinary skill in the art. After reading the specification, and the detailed description of the exemplary embodiment, these persons will recognize that similar results can be achieved in not dissimilar ways.

Accordingly, the detailed description is provided as an example of the best mode of the invention, and it should be understood that the invention is not limited by the detailed description. Accordingly, the invention should be read as being limited only by the claims.

BRIEF DESCRIPTION OF THE DRAWINGS

Various aspects of the invention, as well as at least one embodiment, are better understood by reference to the following EXEMPLARY EMBODIMENT OF A BEST MODE. To better understand the invention, the EXEMPLARY EMBODIMENT OF A BEST MODE should be read in conjunction with the drawings in which.

AN EXEMPLARY EMBODIMENT OF A BEST MODE

Introduction

Figure 1:
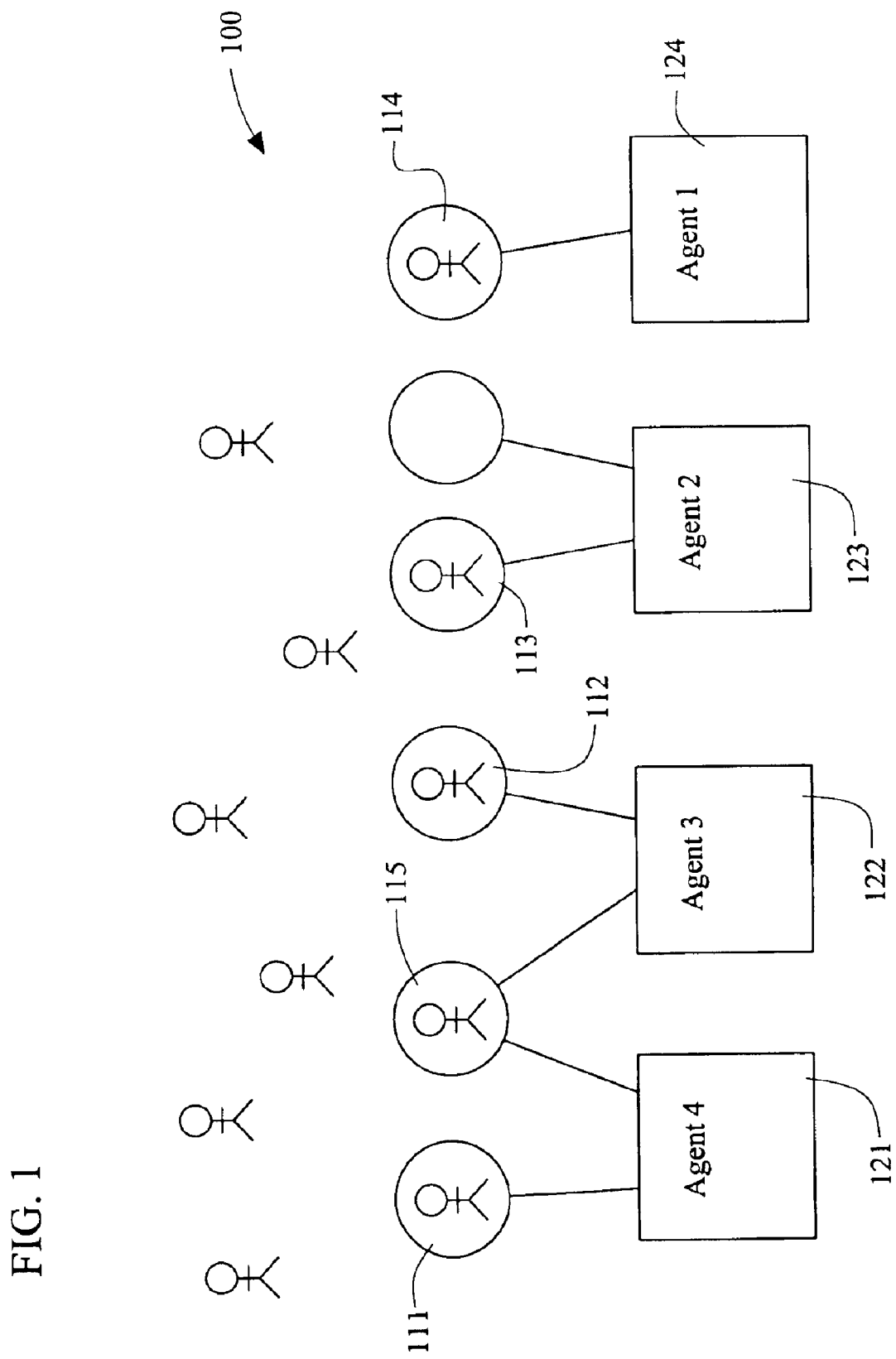
FIG. 1 shows a pooled dynamic method of prospect distribution (prior art)

The invention generally establishes a master queue based on selected criteria. The master queue may or may not have a predefined internal or external predefined order. Next, the invention distributes information about the first prospect available in the master queue available and authorized agents. In one embodiment, information regarding a prospect is distributed to agents on a first come first served basis (each agent will, upon request, receive a prospect's information for contact or for other processing). The prospect information is distributed without unintentional duplication, and can be updated dynamically. The invention includes many other features and benefits which are described, sometimes in reference to the drawings, below.

Interpretation Considerations

When reading this section (An Exemplary Embodiment of a Best Mode, which describes an exemplary embodiment of the best mode of the invention, hereinafter "exemplary embodiment"), one should keep in mind several points. First, the following exemplary embodiment is what the inventor believes to be the best mode for practicing the invention at the time this patent was filed. Thus, since one of ordinary skill in the art may recognize from the following exemplary embodiment that substantially equivalent structures or substantially equivalent acts may be used to achieve the same results in exactly the same way, or to achieve the same results in a not dissimilar way, the following exemplary embodiment should not be interpreted as limiting the invention to one embodiment.

Likewise, individual aspects (sometimes called species) of the invention are provided as examples, and, accordingly, one of ordinary skill in the art may recognize from a following exemplary structure (or a following exemplary act) that a substantially equivalent structure or substantially equivalent act may be used to either achieve the same results in substantially the same way, or to achieve the same results in a not dissimilar way.

Accordingly, the discussion of a species (or a specific item) invokes the genus (the class of items) to which that species belongs as well as related species in that genus. Likewise, the recitation of a genus invokes the species known in the art. Furthermore, it is recognized that as technology develops, a number of additional alternatives to achieve an aspect of the invention may arise. Such advances are hereby incorporated within their respective genus, and should be recognized as being functionally equivalent or structurally equivalent to the aspect shown or described.

Second, the only essential aspects of the invention are identified by the claims. Thus, aspects of the invention, including elements, acts, functions, and relationships (shown or described) should not be interpreted as being essential unless they are explicitly described and identified as being essential. Third, a function or an act should be interpreted as incorporating all modes of doing that function or act, unless otherwise explicitly stated (for example, one recognizes that "tacking" may be done by nailing, stapling, gluing, hot gunning, riveting, etc., and so a use of the word tacking invokes stapling, gluing, etc., and all other modes of that word and similar words, such as "attaching"). Fourth, unless explicitly stated otherwise, conjunctive words (such as "or", "and", "including", or "comprising" for example) should be interpreted in the inclusive, not the exclusive, sense. Fifth, the words "means" and "step" are provided to facilitate the reader's understanding of the invention and do not mean "means" or "step" as defined in §112, paragraph 6 of 35 U.S.C., unless used as "means for—functioning—" or "step for—functioning—" in the Claims section.

Computer Systems as an Exemplary Device

A computer system typically includes at least hardware capable of executing machine readable instructions, as well as the software for executing acts (typically machine-readable instructions) that produce a desired result. In addition, a computer system may include hybrids of hardware and software, as well as computer sub-systems.

Hardware generally includes at least processor-capable platforms, such as client-machines (also known as personal computers or servers), and hand-held processing devices (such as smart phones, personal digital assistants (PDAs), or personal computing devices (PCDs), for example). Furthermore, hardware typically includes any physical device that is capable of storing machine-readable instructions, such as memory or other data storage devices. Other forms of hardware include hardware sub-systems, including transfer devices such as modems, modem cards, ports, and port cards, for example. The way hardware is organized within a system is known as the system's architecture (discussed below).

Software includes any machine code stored in any memory medium, such as RAM or ROM, machine code stored on other devices (such as floppy disks, or a CD ROM, for example), and may include executable code, an operating system, as well as source or object code, for example. In addition, software encompasses any set of instructions capable of being executed in a client machine or server—and, in this form, is often called a program or executable code.

Hybrids (combinations of software and hardware) are becoming more common as devices for providing enhanced functionality and performance to computer systems. A hybrid is created when what are traditionally software functions are directly manufactured into a silicon chip—this is possible since software may be assembled and compiled into ones and zeros, and, similarly, ones and zeros can be represented directly in silicon. Typically, the hybrid (manufactured hardware) functions are designed to operate seamlessly with software. Accordingly, it should be understood that hybrids and other combinations of hardware and software are also included within the definition of a computer system and are thus envisioned by the invention as possible equivalent structures and equivalent methods.

Computer sub-systems are combinations of hardware or software (or hybrids) that perform some specific task. For example, one computer sub-system is a soundcard. A soundcard provides hardware connections, memory, and hardware devices for enabling sounds to be produced and recorded by a computer system. Likewise, a soundcard may also include software needed to enable a computer system to detect the soundcard, recognize the soundcard, and drive the soundcard.

Sometimes the methods of the invention may be practiced by placing the invention on a computer-readable medium. Computer-readable mediums include passive data storage, such as a random access memory (RAM) as well as semi-permanent data storage such as a compact disk read only memory (CD-ROM). In addition, the invention may be embodied in the RAM of a computer and effectively transform a standard computer into a new specific computing machine.

Data structures are defined organizations of data and enable an embodiment of the invention. For example, a data structure may provide an organization of data, or an organization of executable code (executable software). Furthermore, data signals are carried across transmission mediums and store and transport various data structures, and, thus, may be used to transport the invention. It should be noted in the following discussion that acts with like names are performed in like manners, unless otherwise stated.

Architectures and Databases

The invention should not be interpreted as being limited to any specific architecture. For example, the invention may be executed on a single computer, Ethernet networks, local area networks, a wide area network, internets, hand-held and other portable and wireless devices and networks.

A database may be any standard or proprietary database software, such as Oracle, Microsoft Access, SyBase, or DBase II, for example. Accordingly, the database has fields, records, data, and other database elements which may be associated through database specific executable software code. Mapping is the process of associating one data entry with another data entry. For example, the data contained in the location of a character file can be mapped to a field in a second table. The physical location of the database is not limiting, and the database may be distributed. For example, the database may exist remotely from the server, and run on a separate platform that is accessible across the Internet, such as on an Application Service Provider (ASP), or another server, for example. Note that more than one database may be implemented in an architecture.

DESCRIPTION OF THE FIGURES

In one embodiment of the invention, an administrator selects criteria that, when applied to prospect data records in a database, define a queue or queues of prospects. The administrator also identifies agents that are to contact prospects. Typically, queues are "soft" queues (otherwise known as "virtual" queues) that comprise prospects, and records of strategic/tactical criteria. The logical queues are capable of accessing appropriate prospect data records as needed. Accordingly, an agent will access a data record associated with a prospect. As soon as an agent completes working with a prospect's data record, the client system requests from a server system an additional data record. Then, the system presents the agent with a next available data record from the database, in the order the data records are arranged in a logical queue.

For comparison purposes, sketches are provided of some existing methods of queuing prospect records. FIG. 1 (prior art) shows a pooled dynamic method of prospect distribution. In a pooled dynamic method of prospect distribution, each agent independently selects a prospect to call from a pool of prospects. In FIG. 1, each stick-person represents a prospect data record, which collectively form a pool of prospect data records 100. A first agent 124 may contact a prospect by selecting the prospect's data record 114 from the pool of prospect data records 100.

Unfortunately, inefficiencies are possible in this system. For example, a second agent 123 wasted time trying to contact the same prospect as the first agent 124, without success, because the prospect was already speaking with the first agent 124. Note that the second agent 123 does contact a prospect having data record 113. Similarly, a third agent 122 and a fourth agent 121 try to simultaneously reach a prospect having data record 115. The prospect reacts predictably by rejecting both the third agent 122 and the fourth agent 121. Accordingly, the third agent 122 contacts a new prospect having prospect data record 112 and the fourth agent contacts a new prospect having prospect data record 111.

Figure 2:
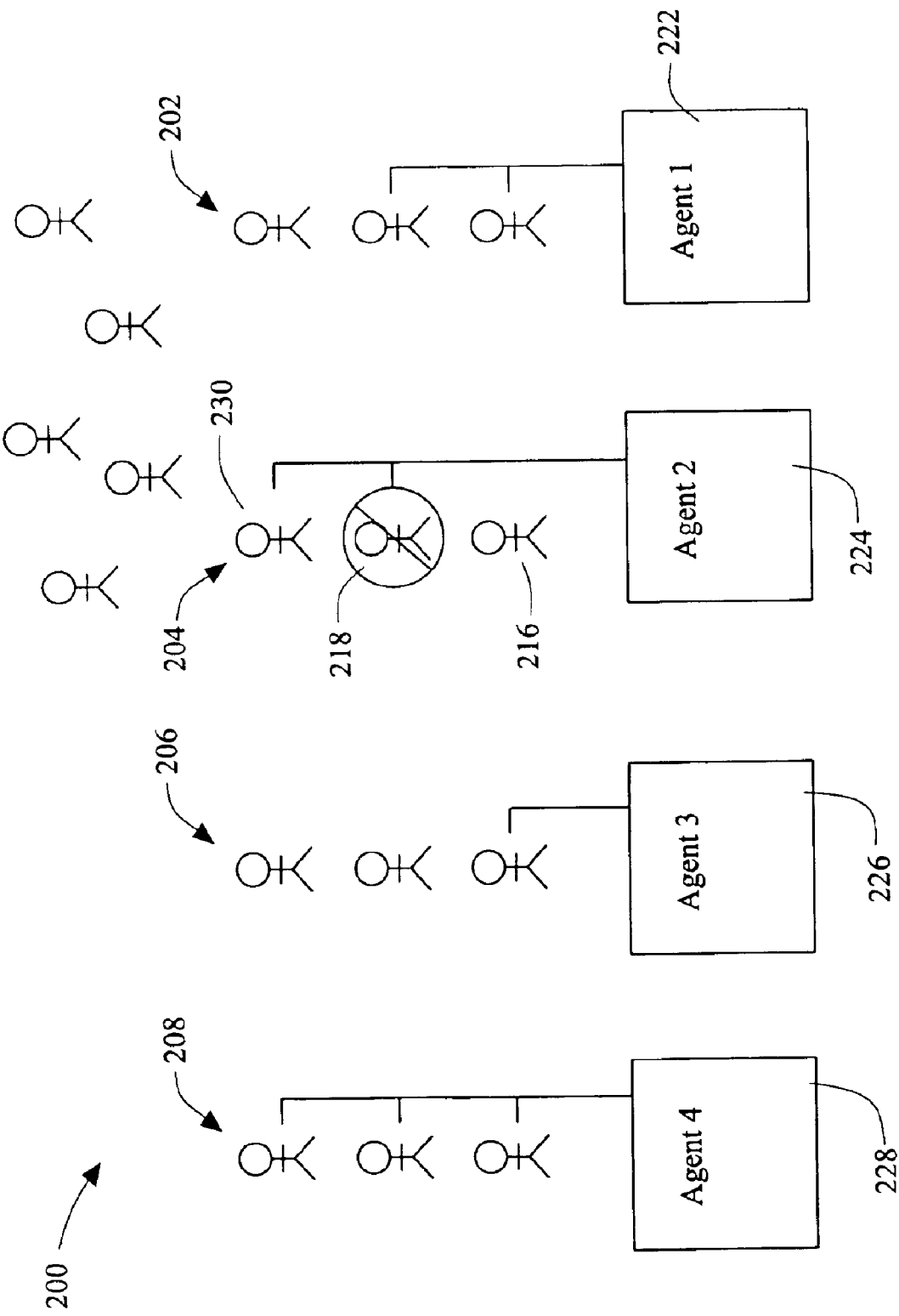
FIG. 2 illustrates a multiple static queue method of prospect distribution (prior art)

FIG. 2 (prior art) illustrates a multiple static queue method of prospect distribution. In a multiple static queue method, prospects are selected from a prospect pool and then evenly divided based on the number of agents. The prospect data records are then queued, and each queue is distributed to an agent. Typically, a supervisor makes the prospect criteria selection, division, queuing, and queue assignment decisions. In FIG. 2 queued prospect data records are selected from a pool of prospect data records 200.

The queued prospect data records are then evenly divided into four queues 202, 204, 206, 208 (because there are four agents). A first agent 222 is shown to have successfully contacted two prospects having prospect data records 212, 214, in the first queue of prospects 202. In addition, a second agent 224 is shown to have failed to contact a first prospect having data record 216, and to have contacted, but failed to sell a second prospect having prospect data record 218. Similarly, the second agent 224 has successfully contacted a third prospect with data record 230. Unfortunately, a third agent 226 appears to be stuck on the phone with a chatty prospect having data record 232, and so has not called any other prospects in his queue 206. Likewise, a fourth agent 228 successfully contacts all prospects in his queue 208. However, the fourth agent 228 will either go home (which encourages poor call-performance) or sit idle until the other agents 222, 224, 226 have contacted all the prospects identified in their corresponding queues.

Figure 3:
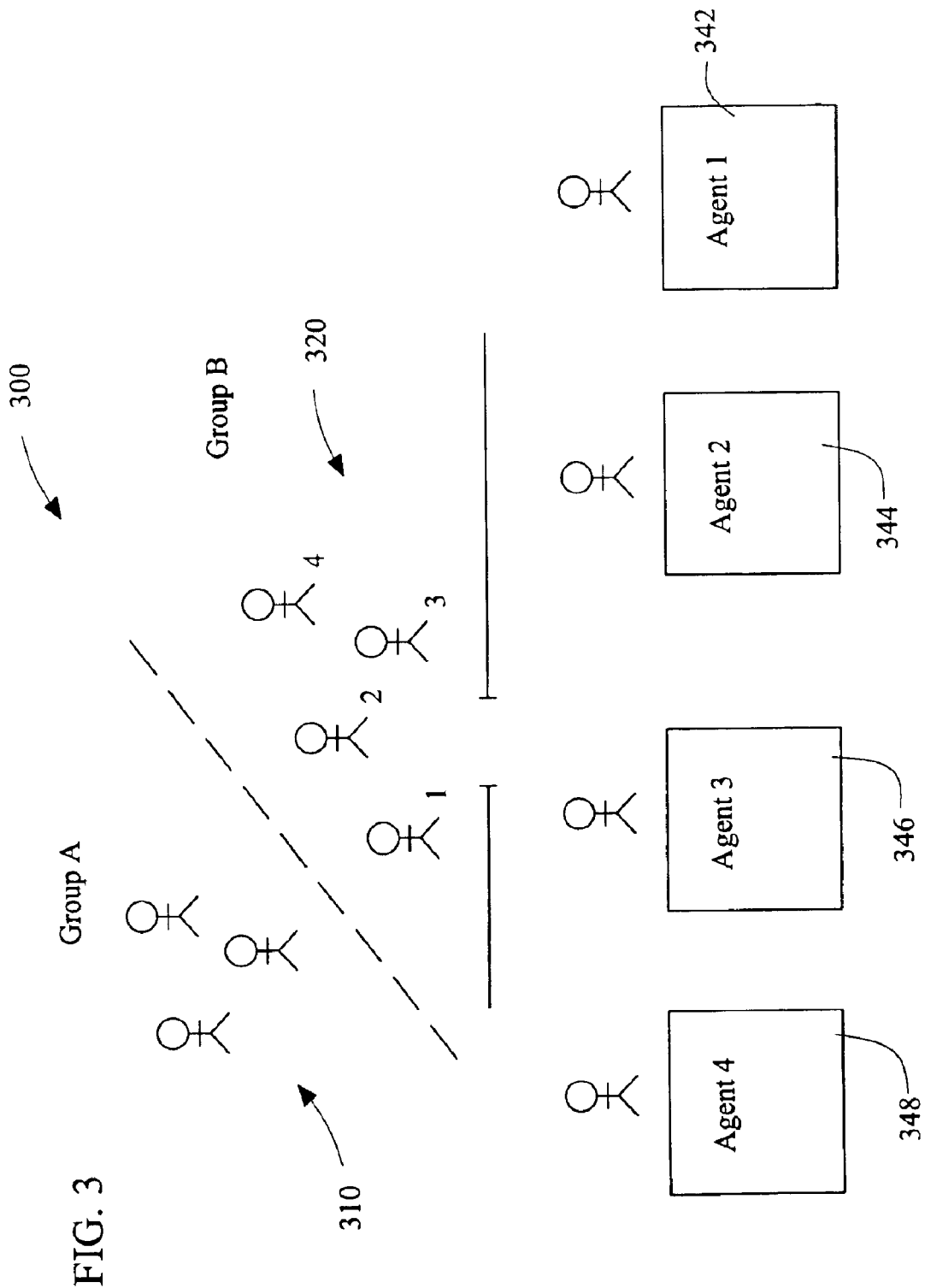
FIG. 3 teaches a single queue dynamic method of prospect distribution.

The invention can also be better understood by reference to drawings. FIG. 3 teaches a single queue dynamic method of prospect distribution to agents. The single queue that is created is sometimes referred to as a virtual queue. The single queue dynamic method uses a pool of prospect information 300 that is then grouped into a first group A 310 of prospect data records not having desired characteristics and who therefore who are not of interest to a current marketing campaign (these prospects are most likely to be ignored), and into a second group B 320 of prospect data records that have certain criteria and characteristics.

The prospect data records in the second group B 320 may then be ordered based on further preferred criteria, as indicated by the numbered subscripts associated with each prospect's data records in the second group B 320, indicative of a priority level. It should be understood that the assignment of priority to each of the prospect data records within a virtual queue is optional, and not required for the invention. However, since in some environments, advantages can be realized by assigning priority to individual data records within a virtual queue, the following discussion assumes that such priority is being used.

In the single queue dynamic method, one prospect's data record at a time (preferably having a highest priority) is sent to a first agent 342. Then, the prospect's data record having a next highest priority level is sent to a second agent 344 and so on until each agent 342, 344, 346, 348 has received a prospect's data record to work with. Eventually, an agent will complete work with a prospect and the prospect's data record. The agent will then be free to work on another prospect. Accordingly, a next prospect's data record from Group B 320 (preferably, in this example, having the then highest priority level) is sent to the agent.

Although not illustrated in FIG. 3, many virtual queues may exist at the same time. Additionally, since a prospect's data record may meet the criteria of more than one campaign, a prospect's data record may be simultaneously assigned to more than one virtual queue at a time. However, when a prospect's data record is accessed by an agent, that's prospect's data record is then said to be "locked", and is inaccessible by any other agent. Thus, in one embodiment, when an agent is using a prospect's data record, that prospect's data record is inaccessible by any other agent processing information in any virtual queue.

Figure 4A:
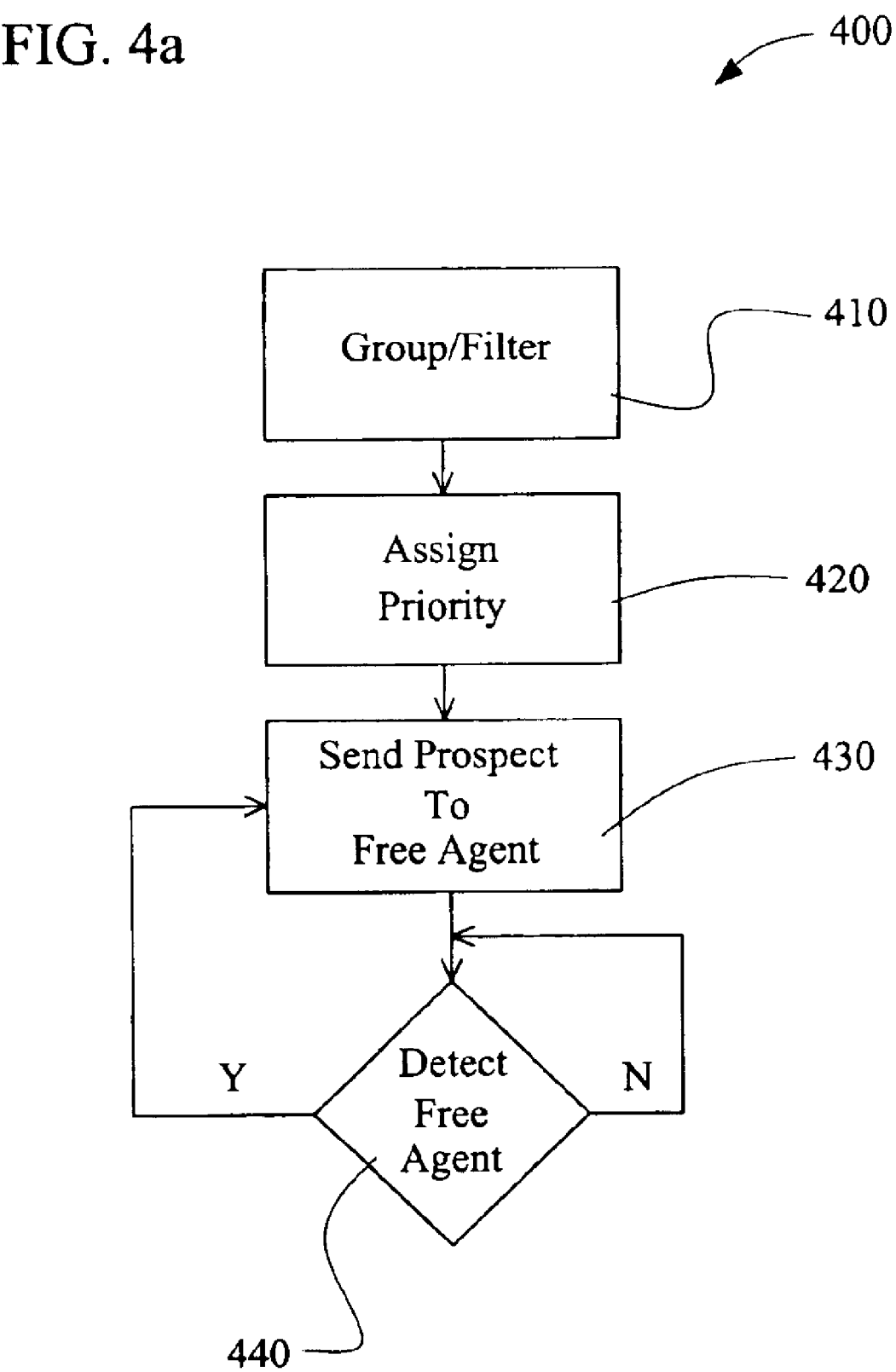
FIG. 4a and 4b show a block-flow diagram of a prospective distribution algorithm.

FIG. 4a is a block-flow diagram of a prospect distribution algorithm 400, which illustrates a method of employing a virtual queue from the viewpoint of a manager, administrator, or system server. The prospect distribution algorithm 400 begins with a group/filter act 410 in which a manager or smart system selects criteria used to identify desired prospects as part of a campaign.

In one embodiment, in an assign priority act 420, desired prospects are assigned priority levels (which may be based on the number of desired characteristics the prospect has, the "strength" of various characteristics such as income, or some other priority level assignment mechanism). Then in a send prospect data record to free agent act 430 a data record for a prospect having a highest available priority level is sent to an agent for contact. Thus, the prospect distribution algorithm 400 builds a virtual logical queue based on a defined set of criteria, and after selecting a prospect from that virtual logical queue, the system passes the prospect data record to an agent and may, at the same time, attempt to contact the prospect.

The prospect distribution algorithm 400 monitors all agent activity, and if an agent is no longer processing a prospect (a free agent) in a detect free agent query 440, then the prospect distribution algorithm 400 returns to the send prospect data record to free agent act 430, as illustrated with the Y path. Similarly, if a free agent is not detected in the detect free agent query 440, then the prospect distribution algorithm 400 performs another detect free agent query 440, as illustrated by the N path.

Figure 4B:
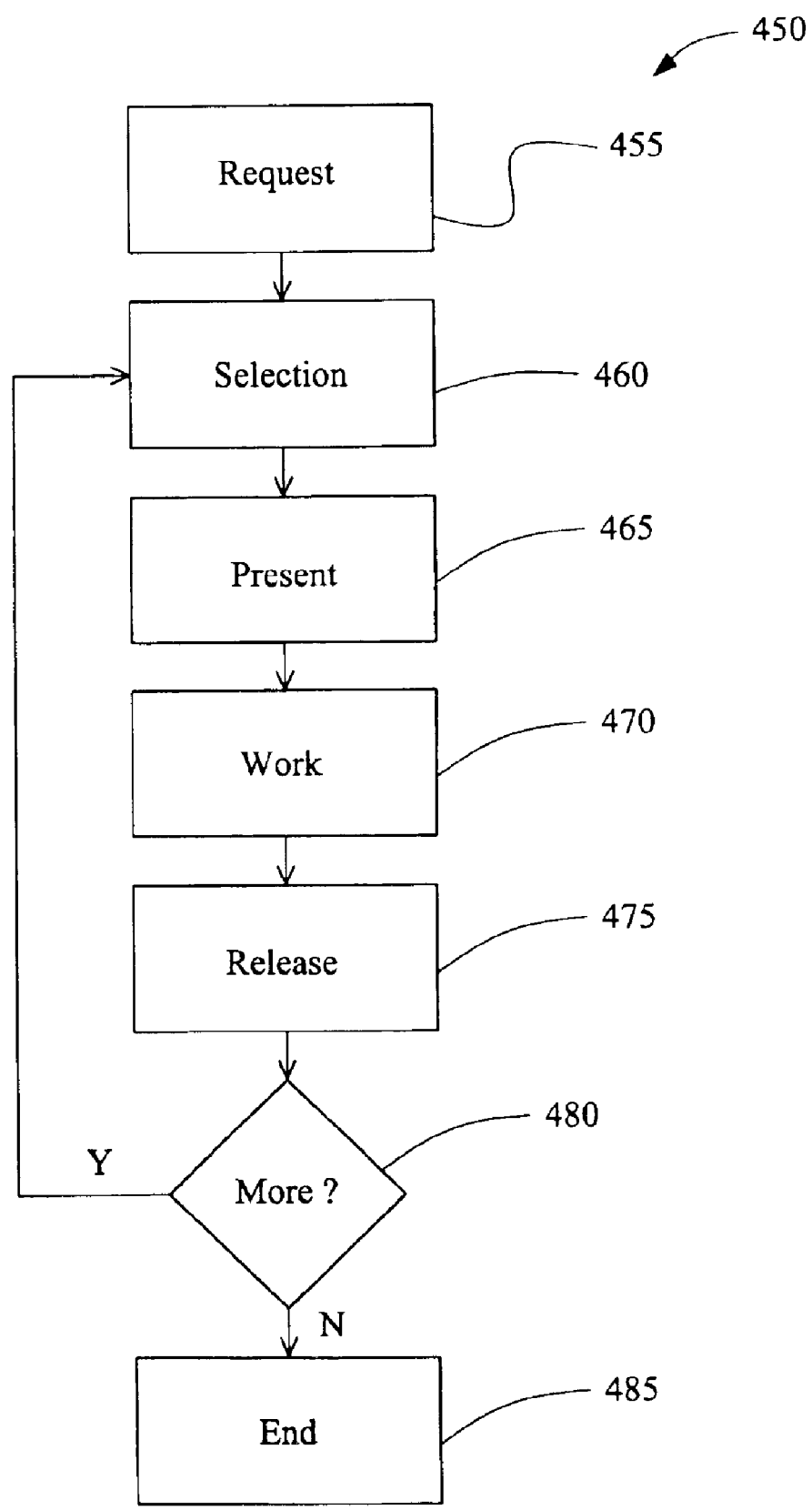

FIG. 4b is a block-flow diagram of a prospect distribution algorithm 450 from the view of an agent or client machine. First, in a request act 455, an agent may request a prospect data record so that the agent may contact the prospect. Alternatively, in the request act 455, a prospect distribution algorithm 400 may detect that the agent is free and send a prospect data record to the agent. Next, in a lock act 460, the prospect data record is locked so that no other agent can access that prospect record. Thus, no other agent can try to contact the prospect (or prospects in one embodiment) that have been selected. However, locked prospect data records may still receive information updates. In other words, if a different part of the system learns new information about a prospect, such as a raise that makes the prospect ineligible for a certain product being sold by an agent, that prospect's data record is updated and that prospect's data record can be eliminated from a respective virtual queue, replaced with an eligible prospect record, or otherwise marked as no longer being an eligible prospect.

Next, the prospect data record is presented to the agent in a present act 465. In one embodiment, a grouping of prospect data records is presented to the agent. Then, the agent will contact the prospect(s), interact, and record information as needed in a work act 470. After the work with the prospect(s) is completed, the agent will release the prospect data record(s) back to the system in a release act 475. When the agent finishes the contact, they select a disposition code that indicates the outcome of the contact. This code is sent to the system so that the outcome of the contact can be recorded. In addition, the system saves and updates prospect information, and then the system releases the prospect record so that another campaign can use the prospect record. Next, the system either logs the agent out of the campaign or selects a next available prospect to continue the contact process. In one embodiment, the decision to log our or continue is based on a previous choice of a manager or an agent. Similarly, other agents logged into the same or other campaign follow the same process and get a new prospect record that meets the campaign's criteria. Of course, no agent will have access to a prospect record that is currently locked.

Accordingly, if the agent remains on duty and needs additional prospects to contact, then in a more query 480 the prospect distribution algorithm 450 returns to the selection act 460 as illustrated by the Y decision. If, however, the agent does not need any further prospects (perhaps at the end of a shift), then the prospect distribution algorithm 450 proceeds along the N path to an end act 485.

Figure 5:
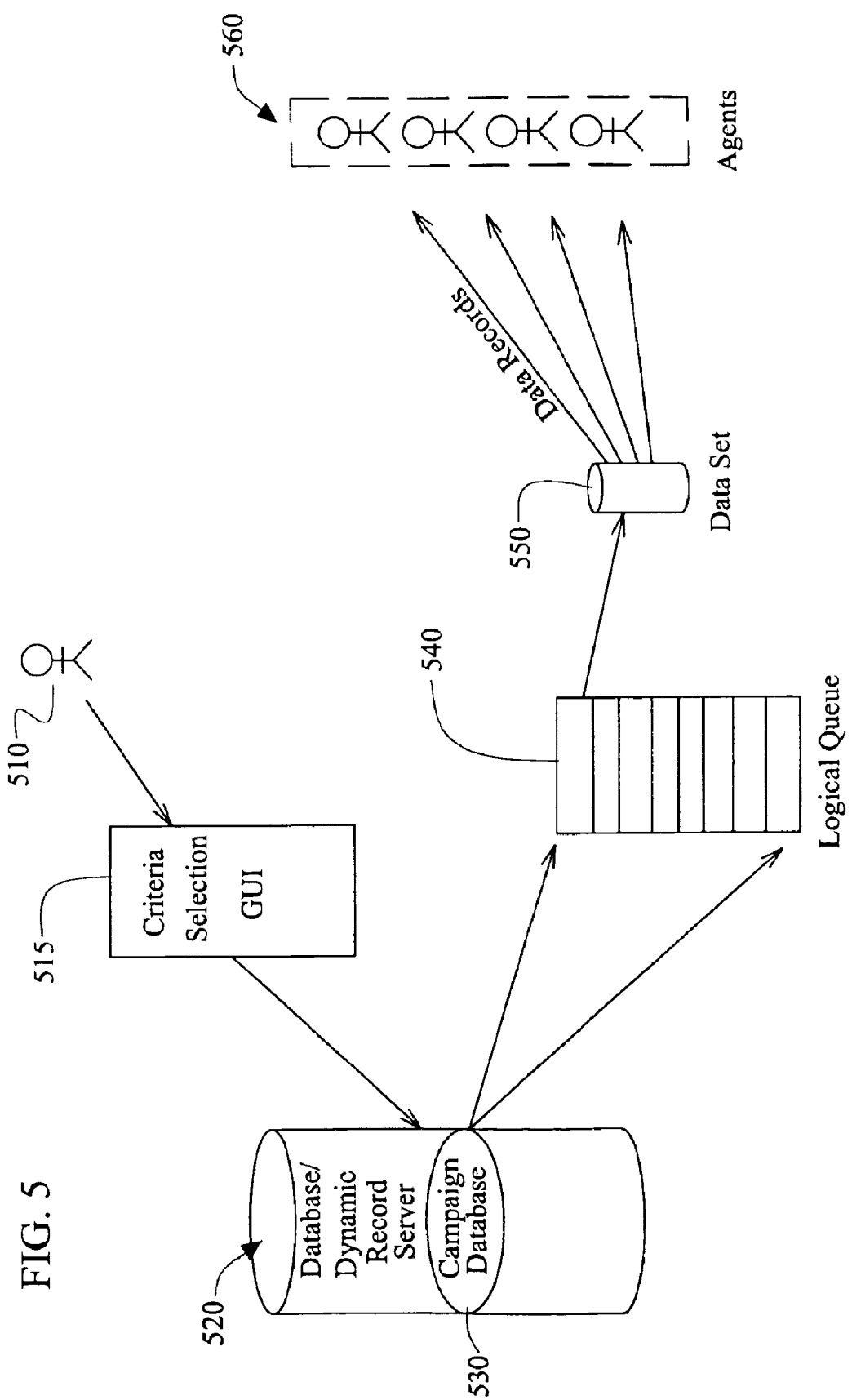
FIG. 5 provides a process-flow diagram of a system that uses a prospect distribution algorithm.

FIG. 5 provides a process-flow diagram of a system that uses a prospect distribution algorithm. Typically, a person such as a manager 510 selects and prioritizes criteria 515 for selecting prospects. However, it should be understood that the criteria and priority can be selected by an automated system. Accordingly, a database 520 (also called a dynamic record server) containing prospect data records is searched for prospect data records meeting the selected criteria. The data records that meet the criteria are logically organized into a database called a campaign database 530.

Next, the prospect data records in the campaign database 530 are placed in a logical queue 540. The prospect data records within the logical queue 540 are internally prioritized, and segregated into virtual data sets. Each virtual data set comprises at least one prospect data record, and is built to be easily handled by a single agent. For example, if there are 400 agents contacting prospects, and 400,000 prospect data records in the campaign database 530, there will be preferably 400,000 prospect data records in the logical queue 540, and these will be segregated into virtual data sets. However, simply dividing the prospects by agents would result in unmanageably large virtual data sets having 1000 prospect data records in each. Accordingly, the system, via intelligence or via active management, may assign a maximum size for each virtual data set, such as 5 prospect data records for each virtual data set. Accessing virtual data sets can be accomplished actively by agents or via an automated system, and may be done one prospect at a time when an additional prospect data record is needed, or may be accessed as a group.

In one embodiment, the system uses prospect identifications (IDs) to reduce the data exchange between the database and an agent. The records are stored and maintained on the database 520. So, when an agent 560 needs a prospect data record, the agent 560 accesses the prospect's data record that is stored and maintained at the database 520 rather than downloading the prospect data record from the database 520. Accordingly, the agent 560 sends a request to the logical queue 540, and the logical queue 540 passes an ID for the prospect's data record to the dynamic record server 520. Thus, the data record of the prospect can be directly used by an agent for purposes of prospect contact.

Next, the actor 560 works on the prospect's data record. After completing work on the prospect's data record, the agent 560 sends code (dispositions) illustrative of the worked prospect's data record to the dynamic record server 520 so that the data record can be updated. Furthermore, the dynamic record server 520 delivers a "next ID" (prospect identifier) of a prospect that meets the predetermined criteria to the agent 560 for processing. It should be understood that an agent may also be a manager. In addition, in one embodiment, a campaign database may be divided into several, sometimes overlapping, criteria-based virtual data sets and logical queues. Furthermore, in another embodiment, an agent may have access to any one or more of the queues, and any number of data records at a time.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

What is claimed is:

1. In a call center campaign system, a method of dynamically allocating prospect data records, comprising: segregating prospect data records into a first group of prospect data records (the first group) and a second group of prospect data records (the second group) based on at least one criteria, wherein the first group defines a virtual queue; and sending a prospect data record from the first group to an agent for processing.

2. The method of claim 1 wherein a prospect data record is selected for the first group if it meets a desired criteria.

3. The method of claim 1 further comprising assigning a priority to a prospect record in the first group.

4. The method of claim 1 wherein segregating is based on a plurality of criteria.

5. The method of claim 1 further comprising a third group of prospect data records defining a second virtual queue, and a prospect data record is selected for in the third group if the prospect data record meets an alternative desired criteria.

6. The method of claim 5 wherein a prospect data record in the third group may be simultaneously a member of the first group or the second group.

7. The method of claim 6 further comprising assigning a prospect data record to a first agent, and then locking the prospect data record so that the prospect data record is inaccessible by a second agent grouping prospect data records in the logical queue into a plurality of data records.

8. The method of claim 1 wherein sending provides a prospect data record to a free agent.

9. The method of claim 1 further comprising assigning a priority level to each prospect data record in the logical queue.

10. The method of claim 9 further comprising sending a prospect data record having a highest priority level to a free agent.

11. The method of claim 10 further comprising sending a second prospect data record having a second highest priority level to a free agent.

12. The method of claim 10 wherein each prospect data record is delivered from the logical queue to a free agent in order of the prospect data record priority level.

13. The method of claim 9 further comprising sending an identification (ID) that identifies a prospect data record having a highest priority level to a free agent so that the free agent may access the prospect data record at a server.

14. The method of claim 9 further comprising: sending a prospect data record having a highest priority level to a free agent; sending a second prospect data record having a second highest priority level to a second free agent; and sending a Nth prospect data record having an Nth highest priority level to an Nth free agent, where N is an integer representing a priority level of a prospect data record and the number of free agents available.

15. The method of claim 14 wherein each agent is sent only one prospect data record at a time from the logical queue.

16. The method of claim 1 wherein each prospect data record is delivered from the first group to a free agent in order of a prospect data record priority level.

17. A call center campaign system that dynamically allocates prospect data records, comprising: a database of prospect data records; wherein the database comprises a campaign database of criteria-qualified prospect data records; and a logical queue comprising criteria-qualified prospect data records from at least the campaign database.

18. The system of claim 17 further comprising: a virtual data set comprising criteria-based prospect data records from the logical queue; a dynamic record server maintained in integration with the database, the dynamic record server having memory and processing that enables a method of dynamically allocating prospect data records; and an agent-accessible computer in communication with the data set.

19. The system of claim 17 wherein each prospect data record is organized according to a priority value.

20. A computing device that dynamically allocates prospect data records, by: segregating prospect data records into a first group and a second group based on at least one criteria; assigning a priority to each data record in the first group; and sending a prospect data record to an agent for processing.

* * * * *